United States Patent [19]

Unewisse

[11] Patent Number: 5,150,519
[45] Date of Patent: Sep. 29, 1992

[54] METHOD FOR PRODUCING A LOCKED, TIGHT PIPE-CONNECTION

[75] Inventor: Heinz Unewisse, Mülheim, Fed. Rep. of Germany

[73] Assignee: Mannesmann Aktiengesellschaft, Düsseldorf, Fed. Rep. of Germany

[21] Appl. No.: 685,401

[22] Filed: Apr. 12, 1991

[30] Foreign Application Priority Data

Apr. 12, 1990 [DE] Fed. Rep. of Germany ....... 4012504

[51] Int. Cl.⁵ ............................................. B23P 11/00
[52] U.S. Cl. .................. 29/890.14; 29/407; 29/517; 29/705
[58] Field of Search ............... 29/890.14, 407, 517, 29/705

[56] References Cited

U.S. PATENT DOCUMENTS

| | | | |
|---|---|---|---|
| 3,114,566 | 12/1963 | Coberly et al. | 29/890.14 |
| 3,343,252 | 9/1967 | Reesor | 29/520 |
| 3,404,906 | 10/1968 | Hutton | 29/890.14 |
| 3,916,502 | 11/1975 | Bagnulo | 29/890.14 |
| 4,026,006 | 5/1977 | Moebius | 29/820 |
| 4,142,744 | 3/1979 | Bennynck | 29/890.14 |
| 4,524,505 | 6/1985 | Conner | 29/890.14 |
| 4,850,096 | 7/1989 | Gotoh et al. | 29/520 |

OTHER PUBLICATIONS

Brochure published by Mannesmann Edelstahlrohr GmbH, 1988 Edition, entitled, "Mannesmann Pressfitting-System/Heizung".

*Primary Examiner*—Irene Cuda
*Attorney, Agent, or Firm*—Nils H. Ljungman and Associates

[57] ABSTRACT

A process apparatus for the manufacture of a permanent, tight pipe joint between a smooth pipe end and a press fitting surrounding it, includes the latter being pressed positively and non-positively onto the inserted pipe end by means of a pressing tool applied to it. The process is characterized by the fact that, after the application of the pressing tool, the pipe already inserted into the press fitting, or the press fitting pushed onto the end of the pipe, is exposed to an adjustable axial force by means of an apparatus located on the pressing tool, and the closing movement of the jaws for the pressing of the press fitting can only be triggered when this force has reached a value which is greater than a specified adjustable response level.

11 Claims, 6 Drawing Sheets

METHOD FOR PRODUCING A LOCKED, TIGHT PIPE-CONNECTION

BACKGROUND OF THE INVENTION

1. Field of the Invention

This invention relates to a process and apparatus for the manufacture of a permanent, tight pipe joint.

2. Background Information

The generic process for the manufacture of a permanent, tight pipe joint, consisting of a press fitting surrounding at least one smooth-ended pipe end and having a stop on the inside at some distance from the open end, in which first the pipe is inserted axially into the press fitting, and then by means of a pressing tool surrounding the press fitting and having several jaws, the press fitting is pressed to form a positive and non-positive connection with the inserted pipe end, after the application of the pressing tool and the movement of the jaws closer to one another. (See brochure published by Mannesmann Edelstahlrohr GmbH, 1988 Edition). This process, known as the Mannesmann Press Fitting System, has been successfully used for many years in heating and installation technology, and has also been used in other applications. The quality of the pipe joint is essentially a function of the quality of the parts to be connected and of the O-ring used. The quality of the pipe joint is also a function of how closely the assembly instructions are followed. Reference is made to the latter point in the above mentioned brochure, in Chapter 4 (Assembly Instructions), with reference to FIG. 6f. According to these instructions, the pipe must be pushed into the press fitting with a slight rotation and simultaneous pressure in the axial direction, up to the press fitting stop, since an insufficient inserted length can have an adverse effect on the strength of the joint.

The system makes it possible to check the position of the inserted pipe, to the extent that the different shapes of fittings, as mentioned above, have a stop located on the inside at some distance from the open end. The distance of the stop from the open end is thereby selected so that it at least equals the insertion length required to achieve a correct pressing. The stop thus provides resistance against further axial insertion of the pipe and is a signal for the pipe fitter that the pipe has reached the desired insertion position.

In spite of this checking capability, the quality and endurance of the pipe joint at this point, too, are a function of the skill and reliability of the pipe fitter. With regard to an additional checking capability, it has already been proposed that the required insertion length be marked on the end of the pipe, e.g. in the form of a triangle, an arrow, or a similar shape. This proposal has the disadvantage that, depending on the conditions on the assembly site, this marking is not always readily visible, and if the marking is not applied over the entire circumference, it can wind up on the side facing away from the pipe fitter. In any case, a marking on the pipe can also be disregarded, just as the assembly instructions can be disregarded, so that regardless of the presence of any markings, the quality of the joint to be made is still dependent on the reliability and skill of the person making the pipe joint.

OBJECT OF THE INVENTION

The object of the invention is to create a process and an apparatus for making a permanent, tight pipe joint, which automatically makes possible a check of the correct insertion position and thus guarantees the manufacture of a correct pipe joint.

SUMMARY OF THE INVENTION

This object is achieved by means of the features disclosed in the characteristic portion of claim 1 and claim 11. Advantageous refinements are disclosed in the subclaims. The process according to the invention is characterized by the fact that a blocking or inhibition of the closing mechanism prevents the completion of the pressing if the pipe has not been inserted sufficiently into the press fitting, or if the two parts have assumed an incorrect insertion position. In general, it can be assumed that the pipe has been correctly inserted into the press fitting as specified by the assembly instructions, up to the stop of the press fitting, and that the correct pressing can then take place. But to be completely independent of the skill and reliability of the pipe fitter, the invention proposes that after the pressing tool is placed over the joint, the pipe or the press fitting must be exposed to a positive force acting in the insertion direction by means of an apparatus located on the pressing tool, and the closing movement of the jaws can only be initiated if the insertion force assumes a value which is greater than a predetermined response level, a preset force. Using the expected normal case as an example, the pipe is manually and correctly inserted into the press fitting up to the stop. Then the pressing tool is applied on the pipe or the press fitting and according to the invention produces a positive force acting in the insertion direction. The positive force is sharply increased because the pipe is against the stop, and the specified response level is reached suddenly. As soon as the force has reached the specified response level, the blocking of the closing movement of the jaws is eliminated and the pressing of the press fitting with the inserted pipe end proceeds. As a result of this process, the correct insertion position is checked automatically and independently of the operator, and pressing in an undesirable insertion position is prevented. The force acting on the pipe or on the press fitting is selected so that it is at least equal to or somewhat greater than the force required for an axial displacement of the pipe or of the press fitting, taking into consideration all the parameters affecting the displacement, but is always less than the specified response level. Such parameters which oppose the axial displacement include, for example, the tolerance of the outside diameter of the pipe to be inserted, the tolerance of the beaded end of the press fitting, the thickness tolerance of the inserted gasket and the friction conditions between the pipe and the gasket. The possible positive axial displacement of the pipe or of the press fitting which is caused by the force exerted by the apparatus is limited, whereby this value is preferably in a range between 2–5 mm and is essentially a function of the nominal size of the pipe joint. The specified limitation of the positive axial displacement, which is several times smaller than the distance from the open end to the stop in the press fitting, is selected to keep the manual operability of the pressing tool in an appropriate ratio to its weight. The freedom of movement available in the vicinity of the assembly should not be further restricted by an excessively large pressing tool.

If, for whatever reason, the pipe has not been correctly inserted into the press fitting up to the stop, a space remains between the end surface of the inserted pipe and the stop. Under these conditions, the invention proposes that the closing movement of the jaws can still be triggered if the distance remaining between the end surface of the pipe and the stop on the press fitting after the manual insertion of the pipe into the press fitting is equal to or less than the maximum specified distance of the positive axial displacement of the pipe or of the press fitting. To give an example of this, the distance remaining after the manual insertion must be 3 mm and the maximum specified distance of the positive axial displacement is 4 mm. That means that after the positive axial displacement by 3 mm, the end surface of the pipe comes in contact with the stop of the press fitting, and the force exerted by the resistance of the stop increases sharply, so that the response level is reached suddenly. When this response level is reached, the closing movement of the jaws can be triggered as described above.

If a distance greater than the maximum specified length of the positive axial displacement remains, the closing movement of the jaws can only be triggered if, after a further manual insertion or a multiple repetition of the positive displacement, the pipe end surface comes into contact with the stop or if the remaining distance is equal to or less than the maximum specified length of the positive axial displacement of the pipe or of the press fitting. The advantage of the process is that regardless of the skill of the operator, the correct pressing for any adjustable insertion length can only be triggered after the undesirable insertion position has been manually eliminated by a further insertion of the pipe, or automatically by multiple repetitions of positive displacement by the apparatus.

BRIEF DESCRIPTION OF THE DRAWINGS

The process and apparatus according to the invention is explained in greater detail below, with reference to the accompanying drawings in which.

DESCRIPTION OF THE PREFERRED EMBODIMENTS

Figure 1:
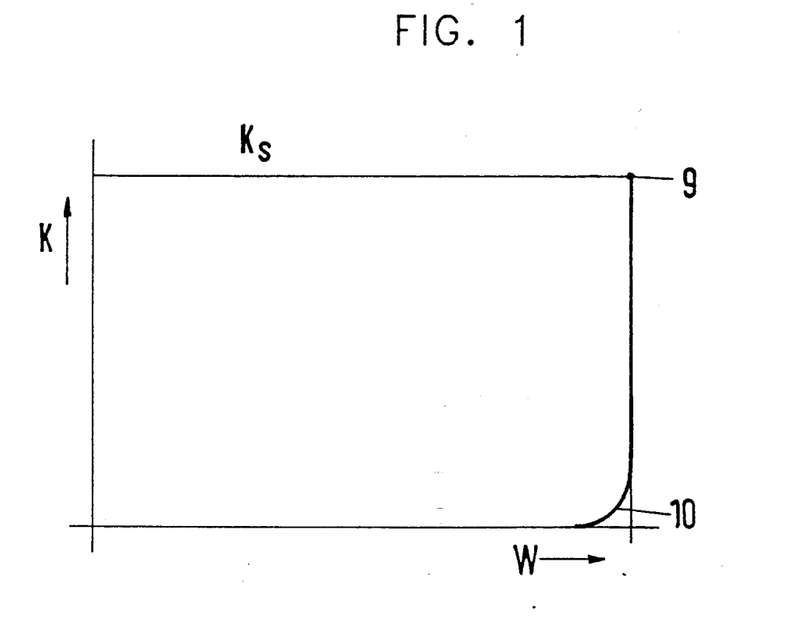
FIG. 1 shows a graphic illustration of the release of the closing block with the force K as a function of the distance W.
Figure 1A:
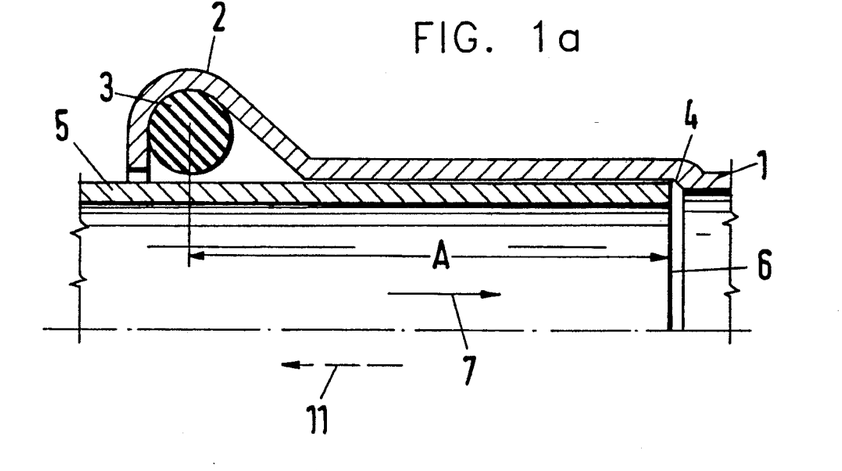
FIG. 1a shows, in partial cross section, a pipe inserted up to the stop of the press fitting.

FIG. 1a shows, in a partial cross section, the press fitting 1 with its bead-shaped end 2 and the gasket 3 inserted in it, as well as the stop 4 located on the inside of the press fitting 1. This FIG. 1a illustrates the normal, expected case, in which the pipe 5 has been correctly inserted into the press fitting up to the stop 4, and the end surface 6 of the pipe 5 is in contact with the stop 4. According to the invention, after the application of the pressing tool (not shown here) by means of an apparatus (also not shown here located on the press tool, the pipe 5 is exposed to a changeable force acting in the direction of displacement which drives the pipe 5 and the press fitting 1 into one another. For the sake of clarity, the force exerted is designated by an arrow 7. Instead of the pipe 5, the press fitting 1 could also be exposed to a force, here designated by the dashed arrow 11. The distance travelled during the manual insertion of the pipe 5 into the press fitting 1 is designated by the letter A, and is the same as the distance from the narrowest point in the gasket area 3 to the stop 4 of the press fitting 1. The correctly inserted position in this case is checked automatically, so that the closing movement of the jaws of the tool for pressing the press fitting 1 to the pipe 5 is initiated only if the force 7 acting in the direction of displacement has reached a value which is greater than a specified response level $K_S$. In FIG. 1, the force is plotted on the ordinate and the distance on the abscissa. The force 7 acting on the pipe 5 attempts to displace the pipe 5 further in the axial direction, but is prevented from doing so by the stop 4. That means that the force 7 increases sharply when pipe 5 contacts stop 4, as indicated by the force curve 10, and suddenly reaches the response level $K_S$. As soon as the force 7 has reached the specified response level $K_S$ 9, the blocking of the closing movement of the jaws of the pressing tool is eliminated, and a correct pressing takes place.

Figure 2:
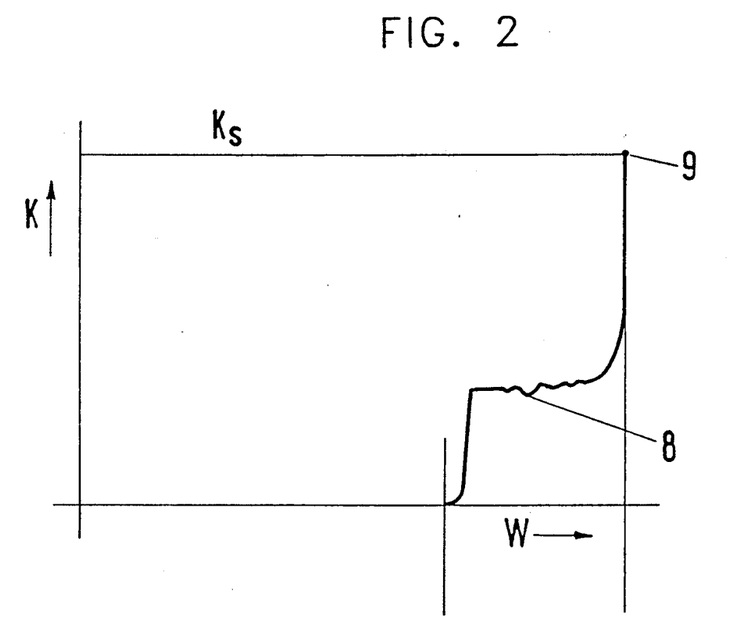
FIG. 2 is a graph with the force K as a function of the distance W.
Figure 2A:
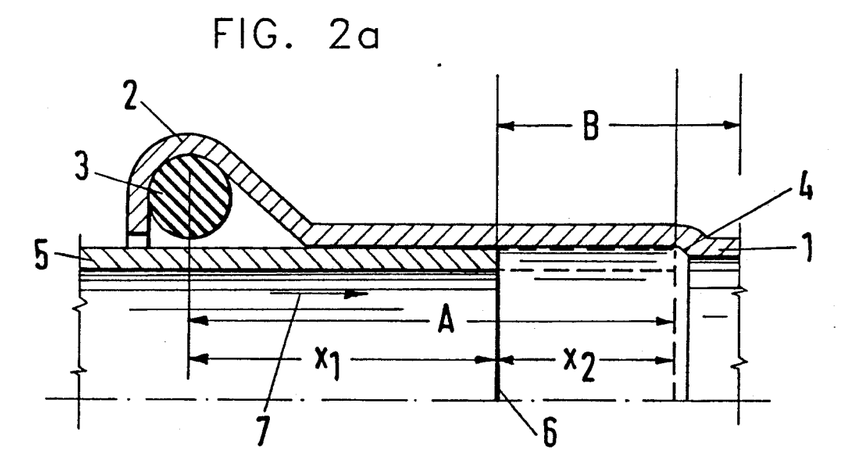
FIG. 2a shows a pipe incompletely inserted into the press fitting.

In the same partial cross section as in FIG. 1a, FIG. 2a shows an inserted pipe 5, but in a different insertion position. The pipe 5 already introduced into the pres fitting 1 is manually pushed axially from the narrowest position in the gasket area 3 by the amount $x_1$ into the press fitting 1. In the example illustrated in FIG. 2a, in violation of the assembly instructions, the pipe 5 has not been inserted all the way to the stop 4. Between the end surface 6 of the pipe 5 and the stop 4 of the press fitting 1, there remains a distance designated $x_2$. In FIG. 2a the distance $x_2$ is shown larger than actual scale for purposes of clarity. Previously, the pressing could be performed even if the inserted pipe 5 was in such an intermediate position, regardless of whether the intermediate position illustrated here represented an undesirable insertion position or not. But according to the invention, after the application of the pressing tool and apparatus located on the pressing tool (not shown here, pipe 5 is engaged and pushed axially by a force 7 toward the stop 4 of the press fitting 1. The distance to be travelled to the stop 4 is designated $x_2$, whereby the sum of $x_1$ and $x_2$ equals the specified distance A from the narrowest position in the gasket area 3 to the stop 4. After the positive displacement by the amount $x_2$, which in this example is less than the maximum specified displacement distance B of which said apparatus is capable, the end surface 6 of the pipe 5 (here shown in dashed lines) comes into contact with the stop 4. The force K necessary for the positive displacement W is illustrated in FIG. 2. A force 8 is required to begin the displacement of pipe 5, which is a function of the tolerances of the parts to be connected and of the friction conditions. As soon as the positively displaced pipe 5 comes in contact with the stop 4, the force increases sharply, and reaches a value 9 which is equal to a specified response level $K_S$. As soon as the force for the positive axial displacement of the pipe 5 has reached 9, the specified response level $K_S$, the blockage of the closing movement of the jaws of the pressing tool is eliminated.

Figure 3:
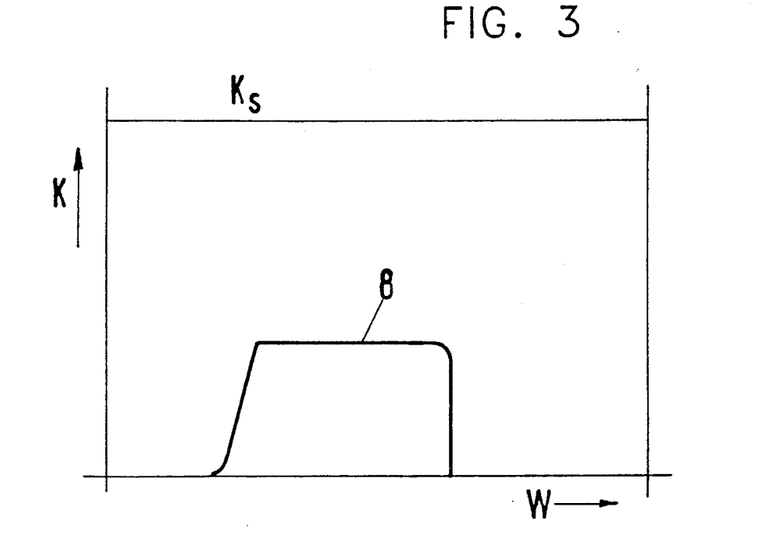
FIG. 3 is a graph with the force K as a function of the distance W.
Figure 3A:
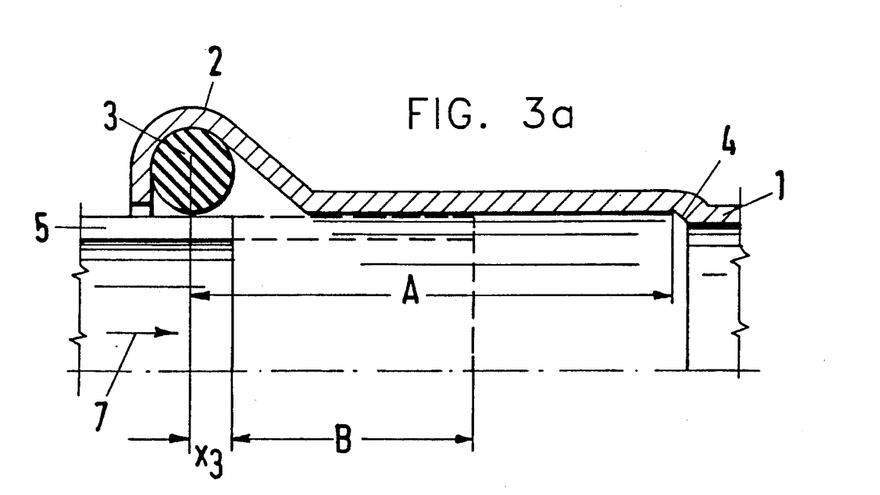
FIG. 3a is the same as FIG. 2a, but with a pipe inserted even less far.

FIG. 3a illustrates the extreme example, in which the pipe 5 has been inserted only barely, and the distance already travelled, here designated $x_3$, is small compared to the distance designated $x_1$ in FIG. 2a. After the application of the pressing tool, the pipe 5 is positively axially displaced by the amount B, i.e. by the maximum possible distance the apparatus is capable of moving the pipe 5. Then the pipe 5 assumes an intermediate position, here illustrated in dashed lines, which in, this case corresponds to an undesirable insertion position. FIG. 3 shows that the Force 8, which is the same as for the example in FIG. 2, is still significantly less than the specified response level $K_S$, and therefore the closing movement remains blocked, even after the end of the positive displacement by the amount B. Pressing under these conditions is impossible. Now, to be able to carry out a correct pressing, the pipe 5 must be displaced further toward the stop 4. This can be done by manually pushing the pipe 5 directly up to the stop 4 (See FIG. 1a) or as far as illustrated in FIG. 2a. Then the pressing tool is applied once again, and the positive displacement is repeated, whereby in the case of the manual displacement up to the stop 4, the force 7 suddenly reaches the response level $K_S$, and the blocking of the closing movement is thereby eliminated. The displacement process, however, can be automated so that the positive displacement by the amount B can be repeated several times until the pipe 5 comes into contact with the stop 4, and then the pressing can proceed.

Figure 4:
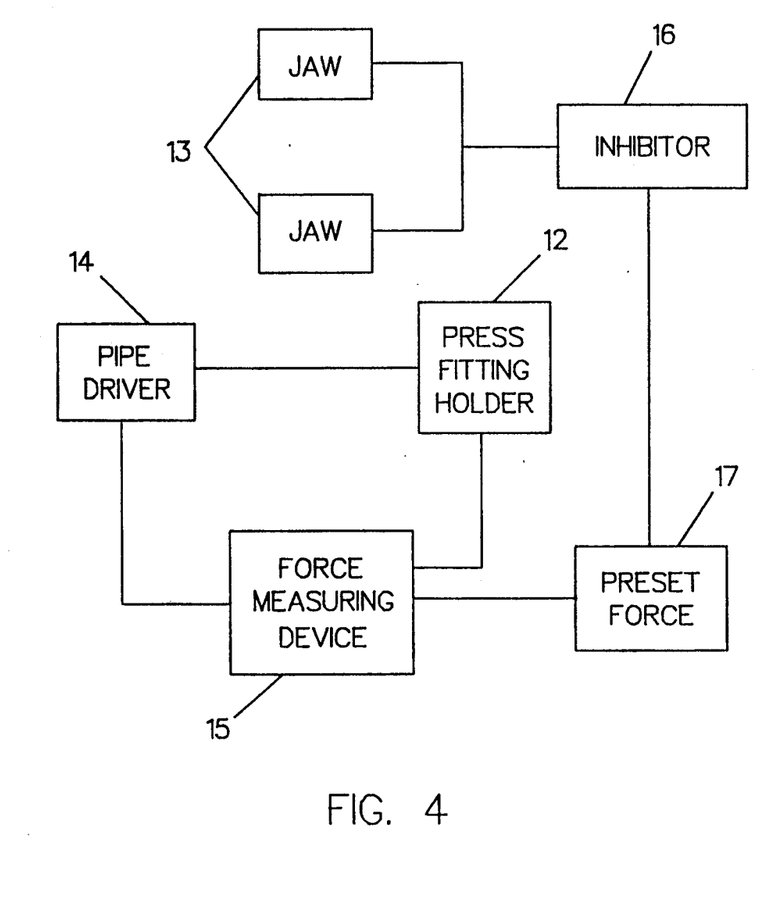
FIG. 4 shows a block diagram which describes the components and functions needed for the invention.

FIG. 4 shows a block diagram showing the different parts needed for the invention. A press fitting holder 12 and jaws 13 to connect the press fitting to the inserted pipe are preferably part of the pressing tool. An apparatus preferably mounted on the pressing tool acts as a pipe driver 14. A force measuring device 15, which is preferably a component of said apparatus, measures the axial force on the pipe produced by the pipe driver 14. An inhibiting device 16 is used to block the closing of the jaws. The measured force is compared to a preset force 17 which is equal to the specified response level, and when the measured force reaches the preset force 17 the inhibitor stops functioning and the jaws 13 can be triggered.

Said pressing tool may comprise U.S. Pat. No. 3,979,814, entitled Pipe Fitting Device; U.S. Pat. No. 4,344,215, entitled Pipefitter's Tool; or U.S. Pat. No. 4,306,345, entitled Pipefitter's Tool.

The pipe joint system may include U.S. Pat. No. 4,570,976, entitled Sleeve-Shaped Coupling for Pipelines.

The force measuring device may include a force transducer such as U.S. Pat. No. 4,899,600, entitled Compact Force Transducer with Mechanical Motion Amplification; U.S. Pat. No. 4,011,577, entitled Mechanical-Electrical Force Transducer with Semiconductor-Insulating Layer-Tin Oxide Composite; or U.S. Pat. No. 4,003,487, entitled Truck Overload Protective System Having Trip Signal Sampling Means. The above measuring device would preferably control a solenoid and electromagnet as an inhibitor. When the measured force reaches the preset force the inhibitor would then be removed and the pressing tool could be triggered.

Figure 5:
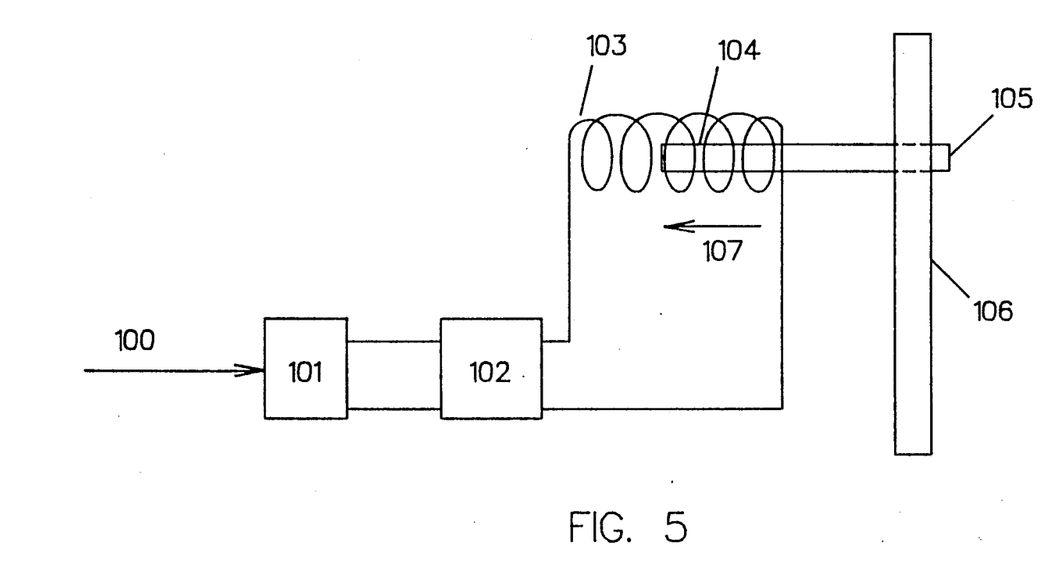
FIG. 5 shows a preferred embodiment of the invention which uses an electronic force transducer.

An embodiment of the invention using an electronic force transducer is shown in FIG. 5. The force 100 applied to force transducer 101 is proportional to the axial force applied to the pipe and pipe fitting. Force transducer 101 is connected electrically to amplifier-switch 102. When the preset force is reached the amplifier-switch 102 activates solenoid 103, and electromagnet 104 is subject to a force in the direction 107.

Thus, inhibitor 105 is removed from trigger device 106, and the jaws can then be triggered by movement of trigger device 106.

An alternative force measuring system employs a spring or beam to which the pipe driving force is applied. The preset force would be determined by the properties of the spring or beam, so when said spring or beam is deformed to the preset level, the inhibitor would be mechanically released, and the pressing tool could then be triggered.

Figure 6:
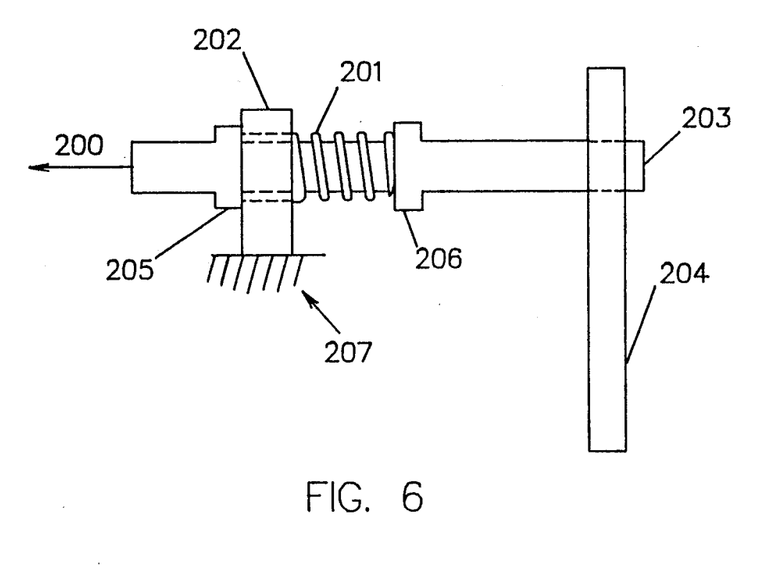
FIG. 6 shows a preferred embodiment of the invention which uses a mechanical force transducer.

An embodiment using a preloaded spring as a measuring device is shown in FIG. 6. In this embodiment a force 200, which is proportional to the axial force applied to the pipe and pipe fitting, is applied to inhibitor 203. Said inhibitor 203 is slidably mounted on the pipe fitting holding device 207. A preloaded spring 201 is held in position by stops 205 and 206. The preload corresponds to the preset force. When force 200 reaches the preset force said inhibitor 203 moves and is removed from trigger device 204. The pressing action can then be triggered through movement of trigger device 204.

One feature of the invention resides broadly in a process for the manufacture of a permanent, tight pipe joint between a smooth pipe end and a press fitting surrounding it, whereby the press fitting has a stop on its inside at some distance from its open end, where —first the pipe is inserted axially into the press fitting, and —then, by means of a pressing tool placed around the press fitting and having several jaws, the press fitting is positively and non-positively connected to the inserted pipe end by the pressing action of the jaws, which move closer together, characterized by the fact that after the application of the pressing tool, the pipe previously manually inserted into the press fitting or the press fitting pushed onto the end of the pipe, is exposed, by means of an apparatus located on the press tool, to a positive, axial, variable force, and the closing movement of the jaws for the pressing of the press fitting can only be triggered when this force assumes a value which is greater than a specified and adjustable response level.

Another feature of the invention resides broadly in a process characterized by the fact that the force acting on the pipe or on the press fitting must be at least equal to or somewhat greater than the force required for an axial displacement of the pipe or of the press fitting, taking into consideration all the parameters acting on the displacement, but is always less than the specified response level.

Yet another feature of the invention resides broadly in a process characterized by the fact that the length of the possible positive axial displacement of the pipe or of the press fitting is limited, and is several times less than the distance from the open end to the stop of the press fitting.

A yet further feature of the invention resides broadly in a process characterized by the fact that the closing movement of the jaws can be triggered whenever the distance remaining from the end surface of the pipe to the stop of the press fitting, after the manual insertion of the pipe into the press fitting, is less than or equal to the maximum specified length of the positive axial displacement of the pipe or of the press fitting.

Yet another feature of the invention resides broadly in a process characterized by the fact that if the distance remaining is greater, the closing movement of the jaws can only be triggered if the end surface of the pipe comes in contact with the stop after a further manual insertion or multiple repetitions of the positive axial displacement.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A process for making a permanent, tight pipe joint between a pipe end and a press fitting surrounding the pipe, the press fitting having a stop on the inside at some distance from an open end for receiving the pipe, said process comprising the steps of:
   providing relative movement between the pipe and the press fitting to axially engage the pipe with the press fitting;
   disposing a pressing tool around the press fitting, the pressing tool for pressing the press fitting and the pipe together to form a joint;
   applying an axial force between the pipe and the press fitting, said axial force being in the engagement direction of the pipe and the press fitting;
   preventing the pressing action of the pressing tool for the pressing of the press fitting until there is a substantial increase in said axial force, being applied between the pipe and the press fitting, to a value greater than a first force; and
   releasing the pressing action of the pressing tool for the pressing of the press fitting when said axial force being applied between the pipe and the fitting assumes a value greater than said first force.

2. A process for making a permanent, tight pipe joint as recited in claim 1, wherein
   said axial force being applied between the pipe and the press fitting is equal to a second force, said second force is at least equal to the force required for an axial displacement of the pipe relative to the press fitting, said second force is always less than said first force.

3. A process for making a permanent, tight pipe joint as recited in claim 2, wherein said axial force is produced by an apparatus;
   said process further comprises the step:
   moving the pipe relative to the press fitting a first length by means of said axial force produced by the apparatus, said first length is limited by the maximum distance the apparatus is capable of moving the pipe relative to the press fitting and said first length is several times less than the distance from the open end of the press fitting to the stop of the press fitting.

4. A process for making a permanent, tight pipe joint as recited in claim 3, further comprising the step:
   triggering the pressing action of the pressing tool whenever the distance remaining from the end surface of the pipe to the stop of the press fitting, after the pipe and the press fitting are axially engaged, is less than or equal to said first length.

5. A process for making a permanent, tight pipe joint as recited in claim 4, further comprising the step:
   triggering the pressing action of the pressing took, if a distance remaining from the end surface of the pipe to the stop of the press fitting is greater than said first length, only when the end surface of the pipe comes in contact with the stop after at least one further axial displacement of the pipe relative to the press fitting.

6. A process for making a permanent, tight pipe joint as recited in claim 5, further comprising the step:
   using a pressing tool which has jaws to achieve the pressing action of said pressing tool.

7. A process for making a permanent, tight pipe joint as recited in claim 6, further comprising the step:
   using smooth-ended pipe.

8. A process for making a permanent, tight pipe joint as recited in claim 7, further comprising the step:
   using a press fitting with an O-ring.

9. A process for making a permanent, tight pipe joint as recited in claim 8, further comprising the step:
   providing relative movement manually between the pipe and the press fitting to axially engage the pipe with the press fitting.

10. A process for making a permanent, tight pipe joint as recited in claim 9, wherein
    said first force is adjustable.

11. A process for making a permanent, tight pipe joint as recited in claim 1, wherein said first force is adjustable.

* * * * *

UNITED STATES PATENT AND TRADEMARK OFFICE
CERTIFICATE OF CORRECTION

PATENT NO. : 5,150,519
DATED : September 29, 1992
INVENTOR(S) : Heinz UNEWISSE It is certified that error appears in the above-identified patent and that said Letters Patent is hereby corrected as shown below:

In column 3, line 68, after 'here', insert --)--.

In column 4, line 29, after the second occurrence of 'the', delete "pres" and insert --press--.

In column 4, line 44, after 'shown', delete "here," and insert --here),--.

In column 8, line 24, Claim 5, after the second occurrence of 'pressing', delete "took," and insert --tool,--.

Signed and Sealed this

First Day of March, 1994

Attest:

BRUCE LEHMAN

*Attesting Officer*     *Commissioner of Patents and Trademarks*